Patented Apr. 22, 1941

2,238,910

UNITED STATES PATENT OFFICE 2,238,910

RECOVERY OF MAGNESIUM FROM VAPOR MIXTURES

Thomas H. McConica, III, Midland, Mich., assignor to The Dow Chemical Company, Midland, Mich., a corporation of Michigan No Drawing. Application August 1, 1940, Serial No. 349,292

5 Claims. (Cl. 75—67)

This invention relates to a process for the recovery of metallic magnesium from vapor mixtures with carbon monoxide.

In the preparation of magnesium by the thermal reduction of magnesia-containing ores with carbon as a reducing agent, the magnesium is liberated at an elevated temperature in the vapor state in admixture with carbon monoxide and must be recovered by condensation. However, as is known, the recovery of magnesium from the vapor mixture is made extremely difficult because of the fact that at ordinary condensing temperatures the magnesium and carbon monoxide tend to interact, reverting to magnesia and carbon. Numerous recovery processes have been suggested for overcoming this difficulty, but most of them are subject to the serious disadvantage that the magnesium is obtained in the form of a pyrophoric dust which can be converted to solid metal only by elaborate and costly treatment.

This latter difficulty is avoided to a considerable extent in a known recovery process in which the magnesium-carbon monoxide vapor mixture is passed into intimate contact with a molten metal absorbent miscible with magnesium, e. g. lead, which is maintained at such a temperature that the magnesium condenses and dissolves therein. The resulting magnesium-containing solution is then separated from the vapor mixture, after which magnesium may be recovered from the solution, as by distillation or fractional crystallization, directly in the form of solid metal. While this process is superior in some respects to other known recovery methods, it is itself subject to the disadvantage that as ordinarily carried out, there is considerable chemical interaction between the magnesium and the carbon monoxide during the absorption step, so that a significant fraction of the magnesium in the vapor mixture is not recovered.

It is an object of the present invention, then, to provide an improvement in the process just described, whereby the chemical interaction between the magnesium and carbon monoxide during the absorption step is minimized, and the overall recovery of magnesium is markedly increased.

The present invention is based upon certain discoveries with respect to the mechanism of the molten metal absorption recovery process. Thus, it has been found that in the absorption step as heretofore carried out, the hot magnesium vapor, on coming into contact with the cooler molten metal absorbent, first condenses to a thin liquid film or "dew" on the surface of the metal, and this film then rapidly diffuses into and becomes dissolved in the body of the absorbent. There is evidence to indicate that most of the loss of magnesium in the process occurs by reaction between the carbon monoxide and this thin film of liquid magnesium just mentioned, and that contrary to previous belief comparatively little interaction occurs while both substances are wholly in the vapor state. Accordingly, by avoiding the formation of any film of liquid magnesium, loss of magnesium by reversion to magnesia can be largely eliminated.

In the invention, the molten metal absorption process is operated in such manner that the absorbent is maintained at a temperature above the boiling point of magnesium at the existing pressure. In this way, the magnesium vapor is absorbed and dissolved in the molten metal without ever forming any film of liquid magnesium. Little reaction occurs between the carbon monoxide and magnesium vapors, and a high recovery of magnesium is realized.

The absorbent used in the process may be any molten metal miscible with magnesium and chemically inert to the magnesium and carbon monoxide. The metal should preferably exert an inappreciable vapor pressure at operating temperatures. Lead, tin, and alloys consisting essentially of one or both of these metals are suitable, lead being preferred.

As stated, the absorption step is carried out at a temperature above the boiling point of magnesium at the pressure existing in the step. Knowing the operating pressure, this minimum temperature can be readily ascertained by reference to a table or curve showing the vapor pressure of magnesium at various temperatures (Int. Crit. Tables, vol. III, p. 205). The maximum operating temperature, of course, is the temperature at which the magnesium vapor ceases to dissolve in the absorbent, i. e. the temperature at which the vapor pressure of magnesium dissolved in the absorbent becomes equal to the partial pressure of the magnesium in the vapor mixture. Temperatures of 800° C. to 1100° C. are ordinarily employed. The pressure in the absorption step may be maintained at any convenient value, as at atmospheric pressure, although absolute pressures below 50 millimeters of mercury are preferred, especially at the lower operating temperatures.

In practice, the magnesium-carbon monoxide mixture may be brought into direct contact with the molten metal absorbent in any desired manner, preferably such way that large surface areas of the absorbent are presented. Thus, it is convenient to pass the vapor mixture countercurrent to a shower of the absorbent. The magnesium-containing absorbent solution thus formed is separated from the vapor mixture, and treated to recover the dissolved magnesium, as by fractional crystallization, or more conveniently, by applying heat to the solution to vaporize magnesium therefrom, and condensing the vapors. The absorbent remaining after the recovery operation, which contains, if any, only a minor proportion of dissolved magnesium, may then be used in the absorption step.

It is to be understood that the foregoing description is illustrative rather than strictly limitative, and that the invention is co-extensive in scope with the following claims.

I claim:

1. In a method of separating magnesium from vapor mixtures with carbon monoxide wherein the vapor mixture is passed into intimate contact with a molten metal absorbent miscible with magnesium and supplied at such temperature that the magnesium vapor is dissolved therein, forming a solution from which magnesium is then recovered, the improvement which comprises maintaining the absorbent in the absorption step at a temperature above the boiling point of magnesium at the pressure existing in the said step.

2. The method of recovering magnesium from vapor mixtures with carbon monoxide which comprises: passing the vapor mixture into intimate contact with a molten metal absorbent miscible with magnesium to form a solution of magnesium in the absorbent, while maintaining the absorbent at a temperature above the boiling point of magnesium at the existing pressure but below the temperature at which the vapor pressure of magnesium dissolved in the absorbent is equal to the partial pressure of magnesium in the vapor mixture; separating the magnesium-containing absorbent solution thus formed from the vapor mixture; and recovering magnesium from the said solution.

3. A process according to claim 2 wherein the molten metal absorbent consists essentially of lead.

4. A process according to claim 2 wherein the absorption step is carried out at an absolute pressure below about 50 millimeters of mercury.

5. The method of recovering magnesium from vapor mixtures with carbon monoxide which comprises: passing the vapor mixture into intimate contact with an absorbent solution which consists essentially of molten lead having dissolved therein a minor proportion of magnesium, while maintaining the said solution at a temperature above the boiling point of magnesium at the existing pressure but below the temperature at which the vapor pressure of magnesium in the said solution is equal to the partial pressure of magnesium in the vapor mixture, whereby magnesium vapor is dissolved in the absorbent solution; separating the solution thus enriched from the vapor mixture; vaporizing magnesium from the separated solution, thereby regenerating the latter for re-use in the absorption step; and condensing the magnesium vapor thus evolved.

THOMAS H. McCONICA, III.